United States Patent
Sullivan

(10) Patent No.: US 10,203,506 B1
(45) Date of Patent: Feb. 12, 2019

(54) APPARATUS, SYSTEM, AND METHOD FOR ADJUSTING HEAD-MOUNTED DISPLAY STRAPS WITH TELESCOPING ASSEMBLIES

(71) Applicant: Oculus VR, LLC, Menlo Park, CA (US)

(72) Inventor: Joseph Patrick Sullivan, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/589,925

(22) Filed: May 8, 2017

(51) Int. Cl.
  *G02B 27/01* (2006.01)
  *F16M 13/00* (2006.01)

(52) U.S. Cl.
  CPC ..... *G02B 27/0176* (2013.01); *G02B 27/0179* (2013.01); *F16M 13/00* (2013.01); *G02B 27/017* (2013.01); *G02B 2027/0185* (2013.01)

(58) Field of Classification Search
  CPC .............................. F16M 13/00; G02B 27/0176
  See application file for complete search history.

(56) References Cited

U.S. PATENT DOCUMENTS

| | | | |
|---|---|---|---|
| 9,474,953 B1 * | 10/2016 | Duke | A63B 69/0071 |
| 2003/0030597 A1 * | 2/2003 | Geist | G02B 27/0172 345/8 |
| 2005/0078378 A1 * | 4/2005 | Geist | G02B 27/0172 359/630 |
| 2007/0236654 A1 * | 10/2007 | Skuro | G02C 3/003 351/118 |
| 2013/0010097 A1 * | 1/2013 | Durnell | A61B 3/113 348/78 |
| 2015/0002373 A1 * | 1/2015 | Kobayashi | G02B 27/017 345/8 |
| 2017/0006949 A1 * | 1/2017 | Lacy | A42B 1/22 |
| 2017/0322410 A1 * | 11/2017 | Watson | G02B 21/0012 |

* cited by examiner

*Primary Examiner* — Chun-Nan Lin
(74) *Attorney, Agent, or Firm* — FisherBroyles, LLP

(57) ABSTRACT

A head-mounted-display adjustment apparatus may include a telescoping assembly. The telescoping assembly may include (1) a track, (2) a boss element that bears upon the track and that is loosely coupled to the track such that the boss element is liftable from the track by a limited distance, and (3) a slide that moves along the track, the slide including a catch that restrains the slide from moving along the track when the boss element bears upon the track. The adjustment apparatus may also include a strap with a distal section coupled to the head-mounted display and a proximal section coupled to the slide such that the strap is extendable, via movement of the slide, away from the head-mounted display.

20 Claims, 17 Drawing Sheets

Boss Element
120

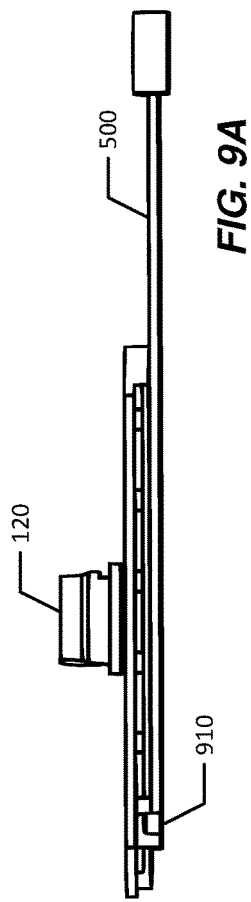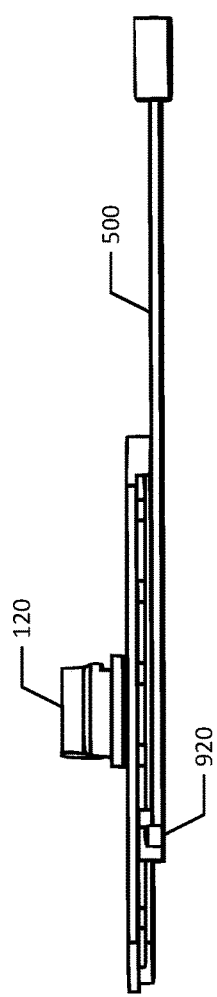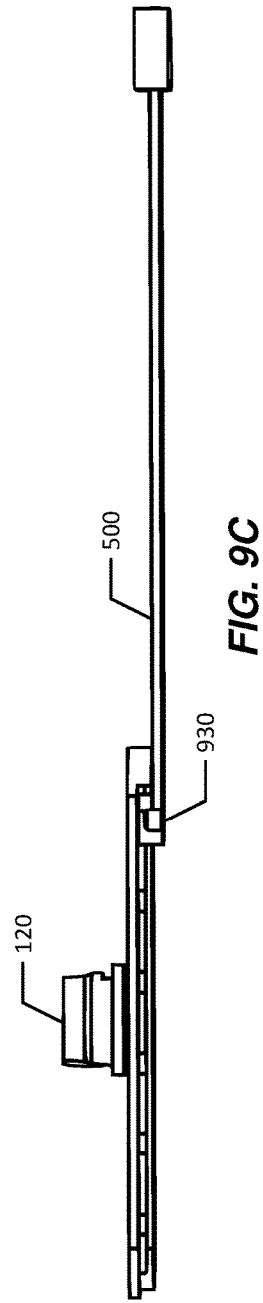

APPARATUS, SYSTEM, AND METHOD FOR ADJUSTING HEAD-MOUNTED DISPLAY STRAPS WITH TELESCOPING ASSEMBLIES

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use them as visualization aids.

In any use of a virtual reality headset, making the experience as immersive as possible may be critical. Regrettably, a variety of factors may disrupt virtual-reality immersion, and one of the most significant disruptions to having an immersive experience may be an ill-fitting headset. Since many headsets may be relatively heavy with most of their weight distributed toward the front, a poor fit may result in significant pressure on a user's face, leading to discomfort that may make a virtual reality experience less compelling.

Traditional virtual reality headsets may provide some limited options for addressing a poor fit, but these options may be sub-optimal. For example, adjusting a traditional headset for comfortable facial pressure and proper size may involve making numerous manual changes over several fitting attempts. This process may be surprisingly time-consuming, and for some users, finding a good fit may be quite difficult. The problem of achieving a good fit may be exacerbated for headsets that are used by multiple people, which may necessitate a refitting before each use. And finding a good fit isn't the only problem with using virtual reality headsets—the configuration of some traditional headset straps may result in awkward, uncomfortable, or comical attempts at putting on or removing headsets.

SUMMARY

As will be described in greater detail below, the instant disclosure generally relates to head-mounted-display-strap apparatuses, systems, and methods. In some examples, a head-mounted-display adjustment apparatus may include a telescoping assembly that includes (1) a track, (2) a boss element that bears upon the track and that is loosely coupled to the track such that the boss element is liftable from the track by a limited distance, and (3) a slide that moves along the track, the slide including a catch that restrains the slide from moving along the track when the boss element bears upon the track. The apparatus may also include a mount that couples the telescoping assembly to a head-mounted display. In addition to the mount, the apparatus may include a strap with a distal section coupled to the head-mounted display and a proximal section coupled to the slide, such that the strap is extendable, via movement of the slide, away from the head-mounted display.

In some examples, the track may include (1) a planar base element and (2) spaced ridges protruding from the planar base element, the spaced ridges defining troughs.

In some embodiments, the boss element may bear upon the track via the slide. In these embodiments, the boss element may inhibit the catch from exiting a trough when the boss element bears upon the track. Additionally or alternatively, the boss element may include a pair of lateral surfaces that define multiple notch pairs. In this example, the slide may include a pair of tabs adapted to catch in each of the notch pairs. The notch pairs in the boss element may align with the plurality of troughs in the track, such that when the pair of tabs fit in a notch pair the catch rests in a corresponding trough.

The slide element may include any suitable elements. For example, the slide element may include a shuttle element that includes the catch and an encasement housing the shuttle element. In some examples, the shuttle element may include a planar shaft element and a pair of arms extending from the planar shaft element. In these examples, the catch may bridge the pair of arms.

The track may be arranged in any suitable manner. For example, the track may include a planar base element, a pair of posts extending from the planar base element, and a bridge element connecting the pair of posts. In this example, the spaced ridges may protrude from the planar base element under the bridge element. The planar shaft element of the shuttle element may, with the pair of arms and the catch, define a hole in the shuttle element between the pair of arms. In some examples, the track and the shuttle element may be interlinked due to one of the pair of posts extending through the hole in the shuttle element such that the catch is situated under the bridge element and between the pair of posts. The boss element may include a band adapted to sit around the pair of posts and to engage with the bridge element when lifted from the track.

In some examples, the pair of arms of the shuttle element may be flexible to allow the boss element to lift the catch above the plurality of spaced ridges without lifting the entire planar shaft element. The proximal section of the strap may be coupled to the slide in any suitable manner. In some examples, the proximal section of the strap may be coupled to the encasement.

According to various embodiments, a corresponding head-mounted-display system may include a telescoping assembly that includes (1) a track, (2) a boss element that bears upon the track and that is loosely coupled to the track such that the boss element is liftable from the track by a limited distance, and (3) a slide that moves along the track, the slide including a catch that restrains the slide from moving along the track when the boss element bears upon the track. The system may also include a head-mounted display and a mount that couples the telescoping assembly to a head-mounted display. In addition to the mount, the system may include a strap with a distal section coupled to the head-mounted display and a proximal section coupled to the slide, such that the strap is extendable, via movement of the slide, away from the head-mounted display.

The system may include more than one strap-adjustment apparatus, as shown in various embodiments herein. For example, the distal section of the strap may be coupled to the head-mounted display via an additional mount that couples an additional telescoping assembly to the head-mounted display. For example, the mount that couples the spring to the head-mounted display may be connected to a first section of the head-mounted display and may be dimensioned to be positioned at a left side of a user's head. Similarly, the additional mount that couples the additional spring to the head-mounted display may be connected to a second section of the head-mounted display that is dimensioned to be positioned at a right side of the user's head. In some examples, the strap may also include a medial section coupled to a third section of the head-mounted display, and the medial section may be dimensioned to be positioned at a user's forehead.

In addition to the various systems and devices described herein, the instant disclosure presents, by way of example, methods associated with head-mounted-display strap systems. For example, a method may include securing, to a head-mounted display, a telescoping assembly including (1) a track, (2) a boss element that bears upon the track and that is loosely coupled to the track such that the boss element is liftable from the track by a limited distance, and (3) a slide that moves along the track, the slide including a catch that restrains the slide from moving along the track when the boss element bears upon the track. The method may also include coupling a distal section of a strap to the head-mounted display and coupling a proximal section of the strap to the telescoping assembly, such that the strap is extendable, via movement of the telescoping assembly, away from the head-mounted display.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9A is a side view of a boss element and shuttle. FIG. 9B is a side view of the boss element and shuttle in an extended state. FIG. 9C is a side view of the boss element and shuttle in a further extended state.

Figure 1:
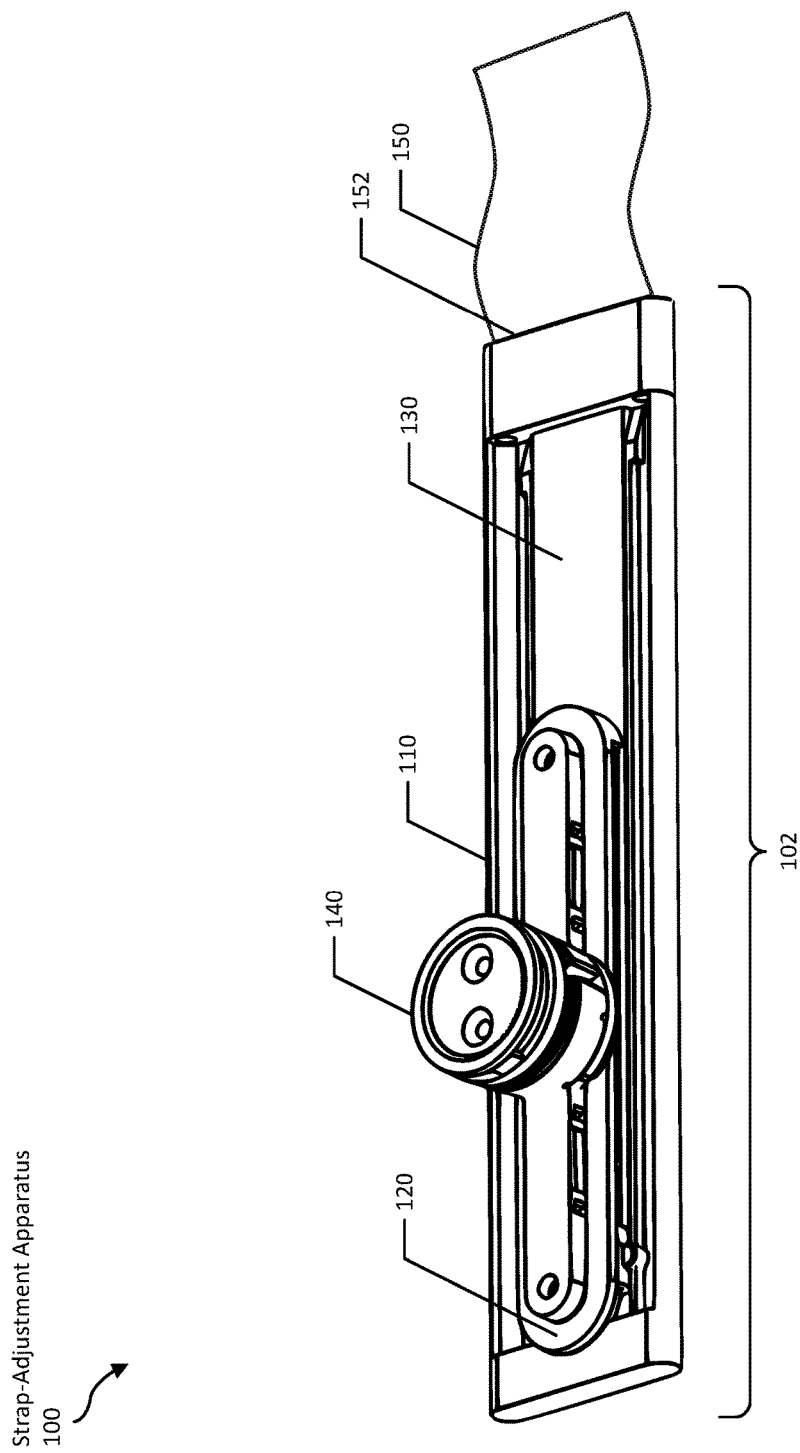
FIG. 1 is a perspective view of a strap-adjustment apparatus coupled to a strap of a head-mounted display.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates, by way of example, various telescoping mechanisms for adjusting head-mounted-display straps. These telescoping mechanisms may be extensibly connected to a head-mounted display and coupled to a strap that holds the head-mounted display against a user's head. The telescoping mechanisms disclosed herein may also provide various features and advantages over conventional strap systems. For example, the telescoping mechanisms disclosed herein may allow for quick adjustment with little mechanical effort (e.g., by simply sliding the encasement of a telescoping assembly), with little mental effort (e.g., because the encasement of the telescoping assembly may be easily located and grasped, even when the user is wearing the head-mounted display and cannot see the telescoping assembly, and/or because the strap may extend or retract as the user causes the telescoping assembly to extend or retract), and/or with precision (e.g., because the telescoping mechanisms may lock into one of several discrete locations). As discussed in greater detail below, the various embodiments disclosed herein, whether used alone or in combination, may help optimize the immersiveness, enjoyability, and/or utility of a virtual- or augmented-reality experience.

The following will provide, with reference to FIGS. 1 and 3-11, examples of devices for adjusting head-mounted-display systems. In addition, the discussion associated with FIGS. 2 and 12-16 will provide examples of head-mounted-display systems that include the devices illustrated in FIGS. 1 and 3-11. Finally, the discussion corresponding to FIG. 17 will provide examples of methods for manufacturing, assembling, configuring, and/or using the head-mounted-display adjustment mechanisms presented herein.

FIG. 1 illustrates an apparatus 100 for adjusting a head-mounted-display strap. Apparatus 100 may include a telescoping assembly 102. The term "telescoping assembly," as used herein, generally refers to a coupling of elements (e.g., one element defining a channel into which another element is adapted to fit) in which the elements are movably attached to each other in a manner that enables the telescoping assembly to shorten and lengthen.

As shown in FIG. 1, telescoping assembly 102 may include a track 110. In addition, telescoping assembly 102 may include a boss element 120 that bears upon track 110 and that is loosely coupled to track 110 such that boss element 120 is liftable from track 110 by a limited distance.

Furthermore, telescoping assembly 102 may include a slide 130 that moves along track 110. Slide 130 may include a catch that restrains slide 130 from moving along track 110 when boss element 120 bears upon track 110. In the example shown in FIG. 1, slide 130 may slide to the right along track 110.

FIG. 1 also shows that a strap 150 may be coupled to telescoping assembly 102. Thus, when slide 130 extends relative to track 110 (e.g., away from a head-mounted display), strap 150 may extend away from the head-mounted display. In other words, strap 150 may be extendable, via movement of slide 130, away from the head-mounted display.

As will be explained in greater detail below, boss element 120 may be liftable from track 110 by a limited distance (i.e., separable from track 110 in the direction of a normal of a plane approximated by track 110 by a limited distance). In some examples, when boss element 120 is in a lifted state, telescoping assembly 102 may admit the movement of slide 130 relative to track 110. When boss element 120 is in a non-lifted state (e.g., resting upon and/or indirectly bearing upon track 110), telescoping assembly 102 may prevent and/or inhibit the movement of slide 130 relative to track 110.

FIG. 1 further shows a mount 140 that couples the telescoping assembly to the head-mounted display. In some examples, mount 140 may be coupled to boss element 120. In this manner, boss element 120 may remain in a fixed position relative to the head-mounted display and track 110 may be partially separated from boss element 120 by pulling track 110 and/or another portion of apparatus 100 coupled to track 110 (e.g., an encasement portion of slide 130, not pictured in FIG. 1) away from the head-mounted display. In some examples, mount 140 may be formed or manufactured as an integral part of telescoping assembly 102 (e.g., as an integral part of boss element 120).

Figure 2:
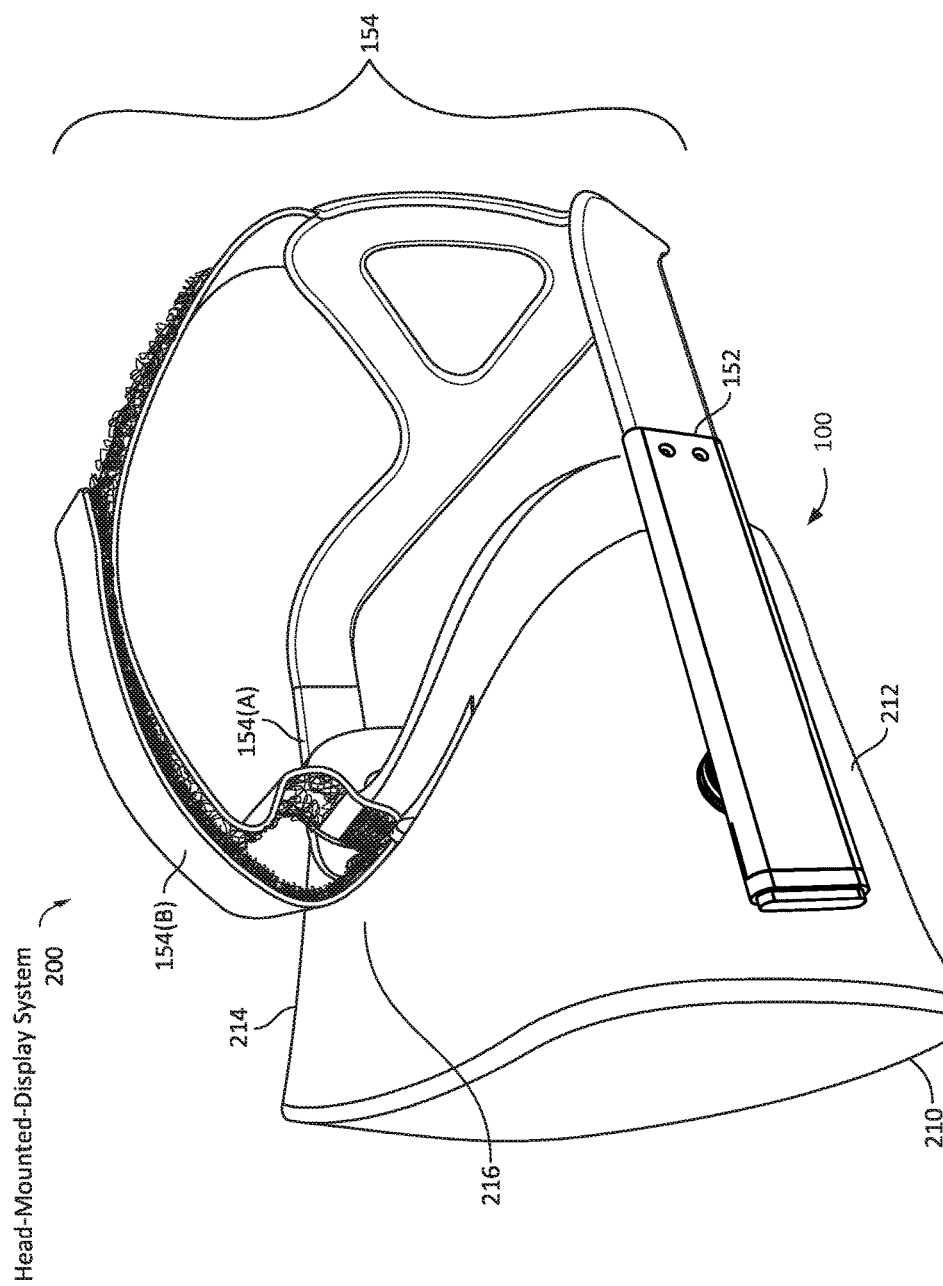
FIG. 2 is a perspective view of a system with a strap-adjustment apparatus coupled to a head-mounted display.

FIG. 2 is a perspective view of a head-mounted-display system 200 with strap-adjustment apparatus 100 coupled to a head-mounted display 210. The term "head-mounted display," as used herein, generally refers to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

Head-mounted displays may be configured to be mounted to a user's head in a number of ways. Some head-mounted displays may be incorporated into glasses or visors. Other head-mounted displays may be incorporated into helmets, hats, or other headwear. Examples of head-mounted displays may include OCULUS RIFT, GOOGLE GLASS, VIVE, SAMSUNG GEAR, etc.

As shown in FIGS. 1 and 2, a proximal section 152 of a strap 150 may be coupled to telescoping assembly 102. The term "strap," as used herein, generally refers any strip of material (plastic, leather, cloth, woven, etc.) used to fasten, secure, or otherwise couple one object (e.g., a head-mounted display) to another (e.g., a user's head). The straps discussed in the present disclosure may be of any suitable shape, size, flexibility, or elasticity (e.g., stretchable or non-stretchable).

Strap 150 may be coupled to telescoping assembly 102 either directly or indirectly. The example in FIG. 1 illustrates a direct coupling of strap 150 to telescoping assembly 102 with proximal section 152 of strap 150 attached to slide 130. In other examples, strap 150 may be coupled to an encasement element of slide 130 (not pictured in FIG. 1). In some examples, strap 150 may be coupled to telescoping assembly 102 by being formed or manufactured as an integral part of telescoping assembly 102 and/or slide 130. Strap 150 may also be coupled to telescoping assembly 102 in any other suitable manner.

Proximal section 152 of strap 150 may be coupled to a side portion 212 (e.g., a left-hand side) of head-mounted display 210. Similarly, a distal section 154 of strap 150 may also be attached to head-mounted display 210, as shown in FIG. 2 and discussed in greater detail in the disclosure corresponding to FIGS. 9-13. Distal section 154 of strap 150 may include a side section 154(A) coupled to a side portion 214 (e.g., a right-hand side) of head-mounted display 210. Distal section 154 of strap 150 may also include a top section 154(B) coupled to a top portion 216 of head-mounted display 210.

Strap-adjustment apparatus 100 may enable a user to make adjustments for fitting head-mounted display 210 to the user's head. Adjustments may extend a strap within a range of approximately 10 mm (or less) to approximately 50 mm (or more) and may size head-mounted-display system 200 to accommodate heads of various shapes and sizes. In some examples, strap-adjustment apparatus 100 may provide for adjustments in discrete intervals (e.g., of approximately 10 mm). In some embodiments, adjustments may be made while a user is wearing a head-mounted display, thus precluding the need to take off the head-mounted display when making fitting alterations.

As noted previously and as will be explained in greater detail below, strap-adjustment apparatus 100 may provide for adjustments in discrete intervals (e.g., because the catch of slide 130 may catch on track 110 at discrete intervals). By providing for discrete adjustment states, strap-adjustment apparatus 100 may simplify the adjustment process, particularly with repeated use. For example, if two users are alternating usage of the head-mounted display, and one user requires approximately 20 mm more strap length than the other for a comfortable fit, then the user who prefers a longer strap may quickly learn to extend telescoping assembly 102 by two 10 mm intervals when taking a turn after the user who prefers a shorter strap length (and, conversely, the user who prefers the shorter strap length may quickly learn to retract telescoping assembly 102 by two 10 mm intervals when taking a turn after the user who prefers a longer strap length).

Figure 3:
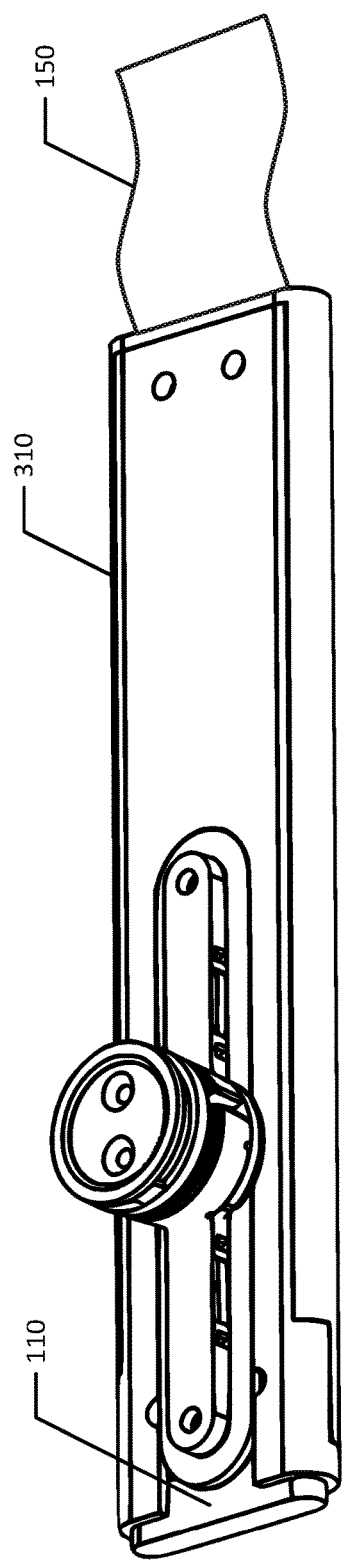
FIG. 3 is a perspective view of a strap-adjustment apparatus that includes an encasement.

FIG. 3 shows an example of a strap-adjustment apparatus with an encasement 310 that forms a part of the slide. For example, slide 130 in FIG. 1 depicts the slide as a shuttle element that slides within track 110. In some examples, slide 130 may also include encasement 310 that houses the shuttle element. Encasement 310 may also house track 110. Thus, the shuttle depicted as slide 130 in FIG. 1 and encasement 310 may be coupled to form a slide with an internal shuttle element that slides within track 110 and an external encasement that slides outside track 110. As shown in FIG. 3, strap 150 may be coupled to telescoping assembly 102 by being coupled to encasement 310 of the slide (rather than, e.g., directly to the shuttle portion of the slide). While encasement 310 may house the majority of the shuttle portion of slide 130 and may also house the majority of track 110 (when telescoping assembly 102 is retracted), the shape of encasement 310 may be adapted to allow boss element 120 to protrude from telescoping assembly 102 an open channel in the encasement 310 may (1) allow boss element 120 to protrude out of the enclosed area formed by encasement 310, (2) allow boss element 120 to be partially separated from the surface of track 110, and/or (3) allow encasement 310, as a part of slide 130, to slide away from boss element 120.

Figure 4:
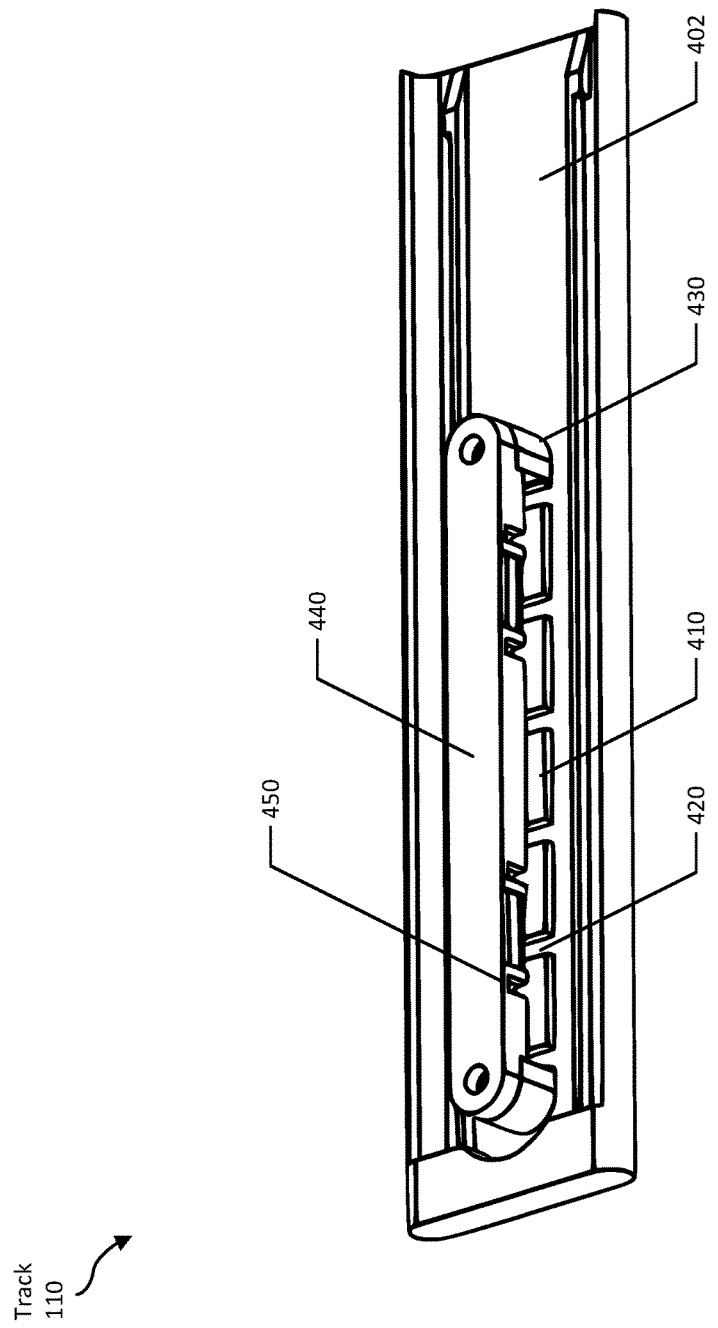
FIG. 4 is a perspective view of a track for a strap-adjustment apparatus.

FIG. 4 shows an example of track 110. As shown in FIG. 4, track 110 may include a planar base element 402. Track 110 may also include a series of spaced ridges that protrude from planar base element 402 (including, e.g., a ridge 410). The series of spaced ridges may be arranged longitudinally (e.g., in a line in the direction in which slide 130 slides along track 110). The series of spaced ridges may define a series of troughs. In some examples, the troughs may be spaced evenly (e.g., each approximately 10 mm apart). Track 110 may also include a pair of posts (including, e.g., a post 430) extending from planar base element 402. In some examples, the posts may, along with adjacent ridges, define troughs. Thus, as shown in FIG. 4, track 110 may include five ridges and six troughs (thereby providing six discrete settings for telescoping assembly 102). A bridge 440 may connect the pair of posts. In some examples, the series of spaced ridges may protrude from planar base element 402 under bridge 440 (i.e., along the length of bridge 440). In some examples, bridge 440 may be shaped to define notches on the underside of bridge 440. For example, the shape of bridge 440 may define four notches on each side of bridge 440 (including, e.g., a notch 450). As will be explained in greater detail below, the catch that forms a part of slide 130 may restrain slide 130 from moving along track 110 when resting in one of the series of troughs. In addition, as will be explained in greater detail below, the notches on the underside of bridge 440 may be adapted to fit with protrusions on boss element 120, such that boss element 120 engages with bridge 440 (and, thus, track 110) when boss element 120 is lifted from track 110 (i.e., separated from planar base element 402 of track 110).

Figure 5:
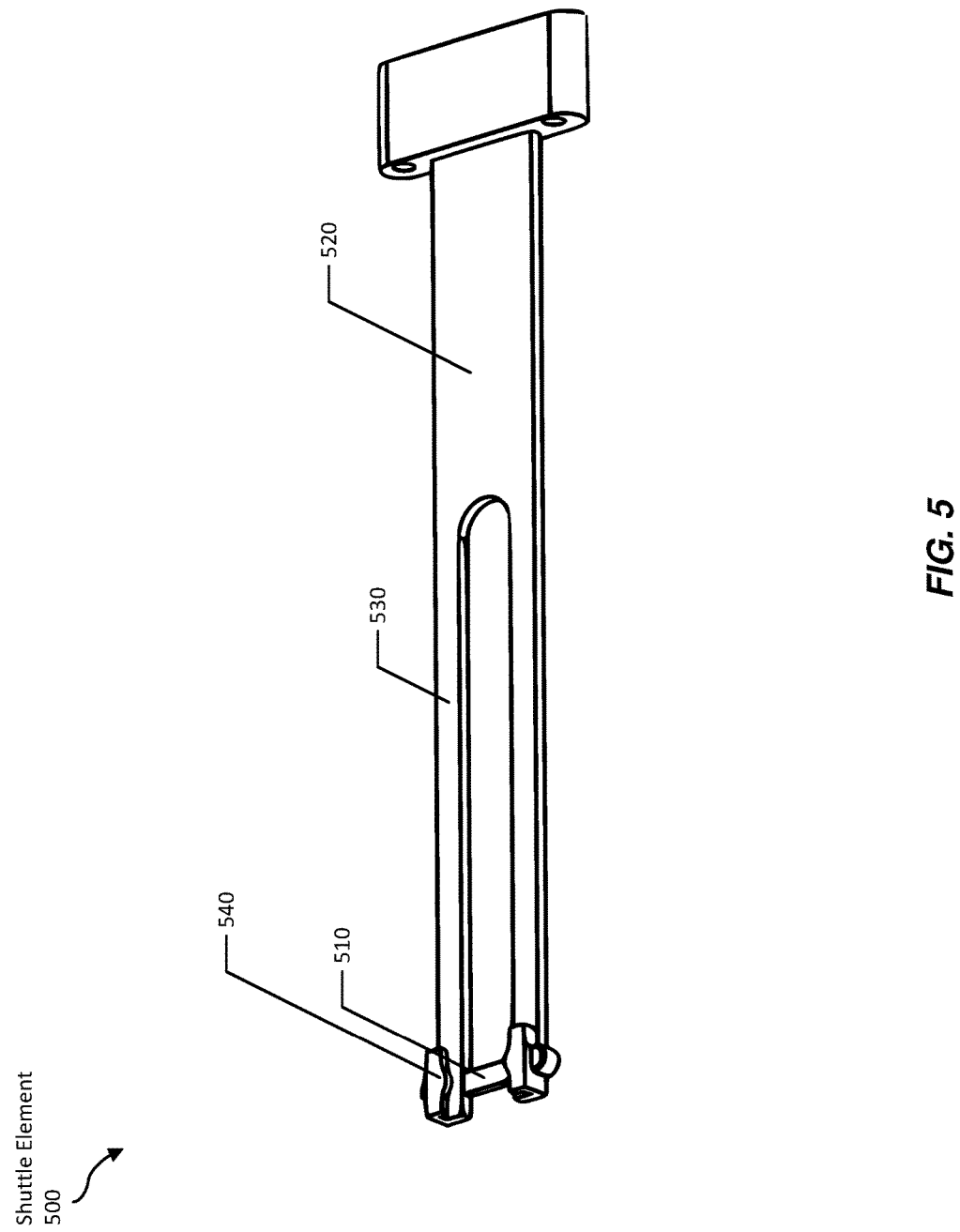
FIG. 5 is a perspective view of a shuttle for a strap-adjustment apparatus.

FIG. 5 shows an example of a shuttle element 500 of the slide (shuttle element 500 is pictured as the entirety of slide 130 in FIG. 1 and pictured as housed in encasement 310 as a part of the slide in FIG. 3). As shown in FIG. 5, shuttle element 500 may include a catch 510. Shuttle element 500 may also include a planar shaft element 520 and a pair of arms extending from planar shaft element 520 (including, e.g., an arm 530). Catch 510 may bridge the pair of arms (in some examples, approximately at the ends of the arms). As mentioned earlier, boss element 120 may bear upon track 110. In some examples, boss element 120 may bear upon track 110 directly (e.g., by resting on planar base element 402 and/or one or more of the series of spaced ridges protruding from planar base element 402). Additionally or alternatively, boss element 120 may bear upon track 110 indirectly (e.g., mediated by one or more layers and/or elements. For example, boss element 120 may bear upon track 110 by resting upon a portion of slide 130 that, in turn, rests upon track 110. For example, boss element 120 may rest upon the arms of shuttle element 500. In some examples, shuttle element 500 may include a pair of tabs (including, e.g., a tab 540). As will be explained in greater detail below, shuttle element 500 may engage with boss element 120 at least partly by the pair of tabs entering one or more notches in the sides of boss element 120.

As indicated earlier, when boss element 120 bears upon track 110, catch 510 may restrain the slide from moving along the track. For example, boss element 120 may bear upon track 110 via slide 130. In particular, boss element 120 may bear upon track 110 via shuttle element 500 of slide 130. In some examples, boss element 120 may bear upon track 110 via the pair of arms of shuttle element 500. Accordingly, boss element 120 may block the pair of arms and/or catch 510 from lifting above the series of spaced ridges and, therefore, may inhibit catch 510 from exiting one of the series of troughs. In some examples, shuttle element 500 may be constructed from a flexible material (e.g., plastic), such that the pair of arms can bend upwards (i.e., away from planar base element 402), allowing catch 510 to escape a trough even when the opposite end of shuttle element 500 does not substantially lift from track 110. However, when boss element 120 bears upon track 110 via the pair of arms of shuttle element 500, boss element 120 may prevent the pair of arms from bending upwards and, therefore, may prevent catch 510 from escaping the trough. Thus, when boss element 120 bears upon track 110, telescoping assembly 102 may be locked in place, preventing strap 150 from being extended or retracted. However, when boss element 120 is lifted from track 110, telescoping assembly 102 may more freely extend and retract.

Figure 6A:
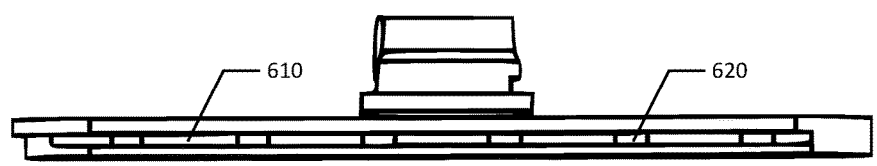
FIG. 6A is a side view of a boss element for a strap-adjustment apparatus.
Figure 6B:
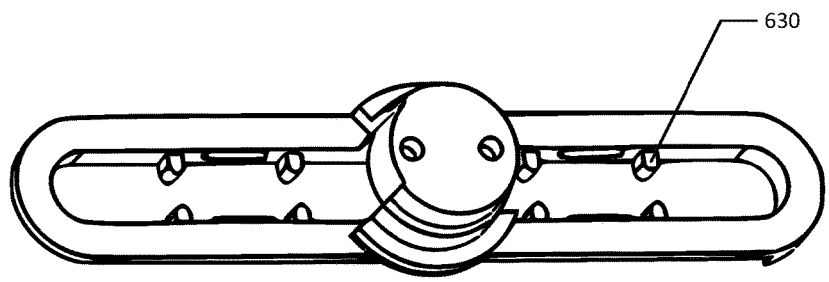
FIG. 6B is a perspective view of the boss element.

FIGS. 6A and 6B show boss element 120. As shown in FIG. 6A, boss element 120 may include a lateral surface 610. Later surface 610 may define a series of notches (including, e.g., a notch 620). The opposite lateral surface may also define a series of notches at corresponding positions, forming a series of notch pairs spaced along the pair of lateral surfaces of boss element 120. In some examples, the series of notch pairs may correspond with the series of troughs in track 110. For example, the series of notch pairs may match the troughs in spacing and/or number. As indicated in FIG. 6A, boss element 120 may have six notch pairs, corresponding to the six troughs pictured in FIG. 4. The spacing and number of troughs and/or notch pairs may vary with a desired strap adjustment scheme. For example, strap adjustment apparatus 100 may provide for strap length adjustments in increments of 5, 6, 7, 8, 9, 10, 11, 12, 13, 14, or 15 mm and may therefore space the troughs and/or notch pairs at corresponding intervals of distance. Likewise, strap adjustment apparatus 100 may provide for 3, 4, 5, 6, 7, 8, 9, or 10 discrete settings and may therefore include a corresponding number of troughs and/or notch pairs. As indicated earlier, slide 130 (in particular, shuttle element 500) may include a pair of tabs adapted to catch in each of the series of notch pairs in boss element 120. Furthermore, the series of notch pairs in boss element 120 may align with the series of troughs in track 110, such that when the pair of tabs fit in a notch pair catch 510 may rest in a corresponding trough (e.g., when the pair of tabs fits into the third notch pair from the left as shown in FIG. 6A, catch 510 may rest in the third trough from the left as shown in FIG. 4).

As shown in FIG. 6B, boss element 120 may include protrusions on the inside of the band of boss element 120 (including, e.g., a protrusion 630). As depicted in FIG. 6B, boss element 120 may include eight such protrusions. As will be explained in greater detail below, the protrusions may engage with track 110 (specifically, within the notches on the underside of bridge 440) when boss element 120 is lifted from track 110.

Figure 7A:
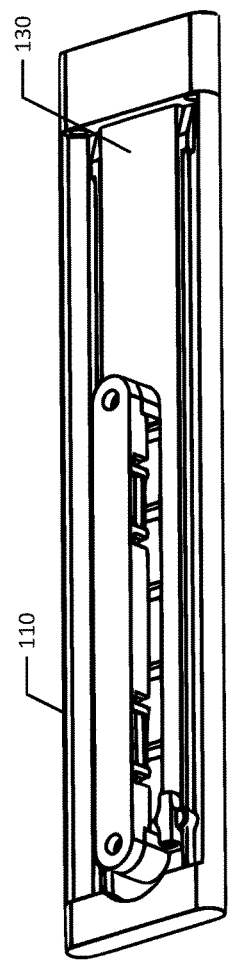
FIG. 7A is a perspective view of a slide and track.
Figure 7B:
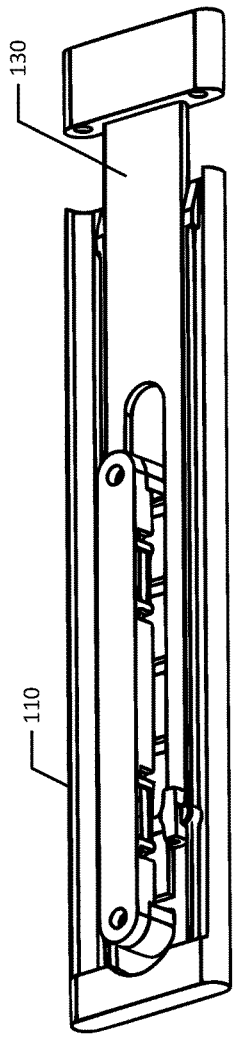
FIG. 7B is a perspective view of the slide and track in an extended state.
Figure 7C:
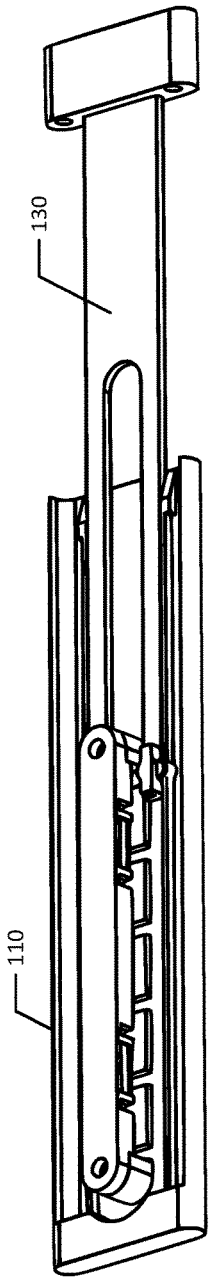
FIG. 7C is a perspective view of the slide and track in a further extended state.

FIGS. 7A, 7B, and 7C show track 110 and slide 130 in different states. For example, FIG. 7A shows telescoping assembly 102 fully retracted, with catch 510 resting in a leftmost trough. FIG. 7B shows telescoping assembly 102 partly extended (e.g., extending strap 150 by 10 mm), with catch 510 resting in a second trough from the left. FIG. 7C shows telescoping assembly 102 fully extended (e.g., extending strap 150 by 50 mm), with catch 510 resting in a right-most trough.

As can be appreciated by examining FIGS. 7A, 7B, and 7C, track 110 and slide 130 may be interlinked. For example, planar shaft element 520, the pair of arms of shuttle element 500, and catch 510 may, together, define a hole in shuttle element 500 between the pair of arms extending from planar shaft element 520. Thus, track 110 and shuttle element 500 may be interlinked due to one of the pair of posts (e.g., post 430) extending through the hole in the shuttle element such that catch 510 is situated under bridge 440 and between the pair of posts.

Figure 8:
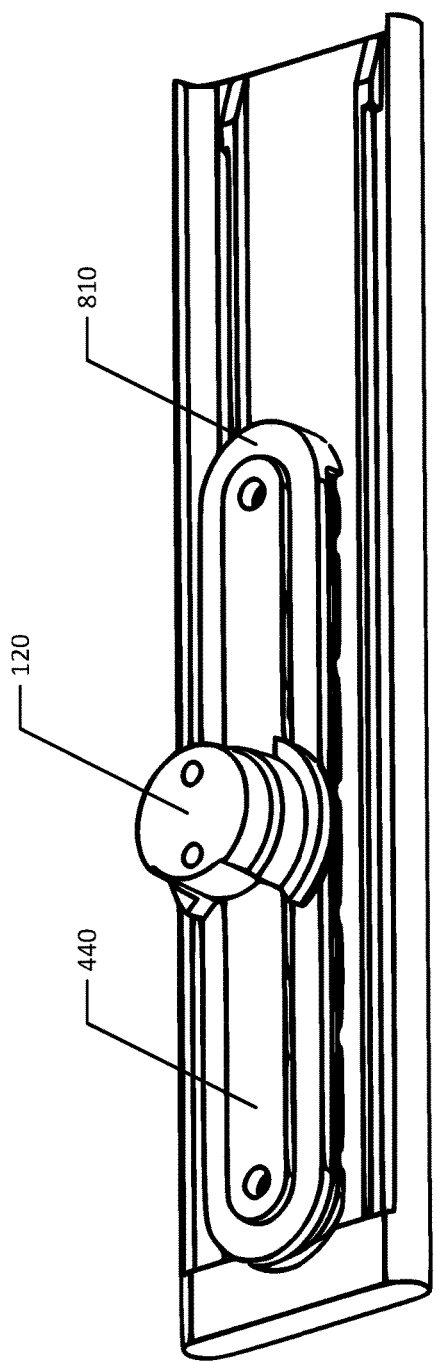
FIG. 8 is a perspective view of a boss element and track.

FIG. 8 shows track 110 and boss element 120. As shown in FIG. 8, boss element 120 may include a band 810 adapted to sit around the pair of posts extending from planar base element 402 of track 110 and to engage with bridge element 440 when lifted from track 110.

FIGS. 9A, 9B, and 9C show boss element 120 and shuttle element 500 in different states. For example, FIG. 9A shows boss element 120 and shuttle element 500 when telescoping assembly 102 is fully retracted, with the pair of tabs of shuttle element 500 fit into the leftmost notch pair of boss element 120 (e.g., at a position 910). As may be appreciated, the state shown in FIG. 9A may correspond to the state shown in FIG. 7A. FIG. 7B shows boss element 120 and shuttle element 500 when telescoping assembly 102 is partly extended, with the pair of tables of shuttle element 500 fit into the second notch pair from the left of boss element 120 (e.g., at a position 920). As may be appreciated, the state shown in FIG. 9B may correspond to the state shown in FIG. 7B. FIG. 9C shows boss element 120 and shuttle element 500 when telescoping assembly 102 is fully extended, with the pair of tables of shuttle element 500 fit into the rightmost notch pair of boss element 120 (e.g., at a position 930). As may be appreciated, the state shown in FIG. 9C may correspond to the state shown in FIG. 7C.

In some examples, the engagement of boss element 120 and shuttle element 500 via the pair of tabs in shuttle element 500 and the notch pairs of boss element 120 may assist in the active adjustment of telescoping assembly 102. For example, when boss element 120 is separated from track 110, one end of shuttle element 500 (e.g., the end opposite from catch 510 and the pair of tabs, pictured as the right end in FIGS. 5, 9A, 9B, and 9C) may remain at approximately the same position relative to track 110, while the other end of shuttle element 500 (e.g., the end with catch 510 and the pair of tabs, pictured as the left end in FIGS. 5, 9A, 9B, and 9C) may lift with boss element 120 (the intermediate portions of shuttle element 500 flexing upward). Once boss element 120 is partially separated from track 110, catch 510 may no longer restrict relative movement between boss element 120 and shuttle element 500, allowing shuttle element 500 to slide to different discrete positions as shown in FIGS. 9A, 9B, and 9C. Because these discrete positions defined by the series of notch pairs in shuttle element 120 may correspond with discrete positions of the series of troughs in track 110, once boss element 120 again bears upon track 110, catch 510 may descend directly into a corresponding trough.

Figure 10:
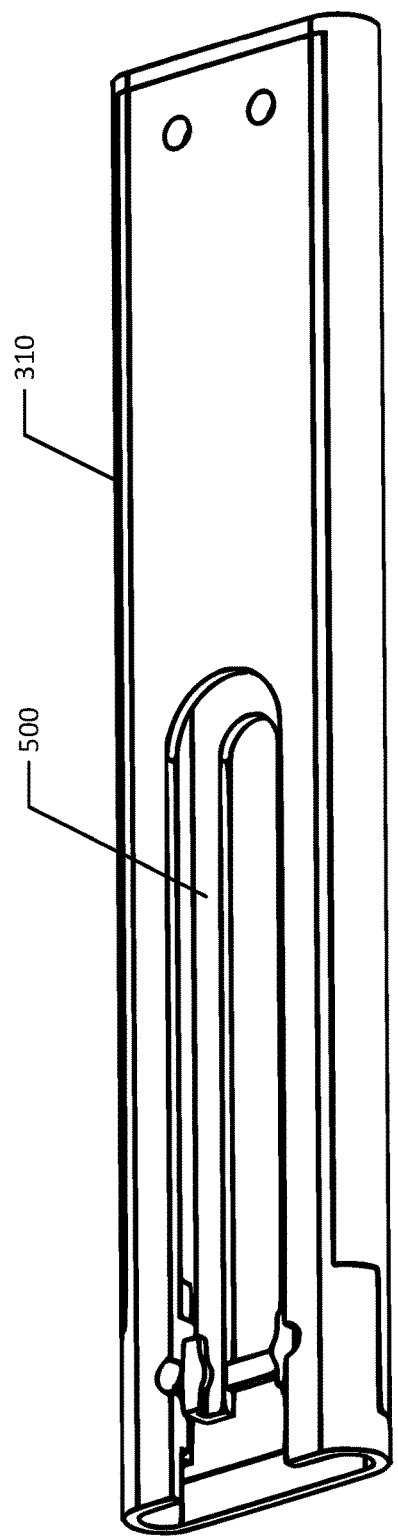
FIG. 10 is a perspective view of a slide.

FIG. 10 shows a slide that includes encasement 310 and shuttle element 500. In one example, one end of shuttle element 500 (e.g., an end opposite from catch 510, depicted as the right end in FIG. 10) may be rigidly coupled with encasement 310, such that encasement 310 and shuttle element 500 move together as a single slide. Nevertheless, the other end of shuttle element 500 (e.g., the end with catch 510, depicted as the left end in FIG. 10) may bend upward when boss element 120 separates from track 110 (e.g., while encasement 310 remains in place).

Figure 11A:
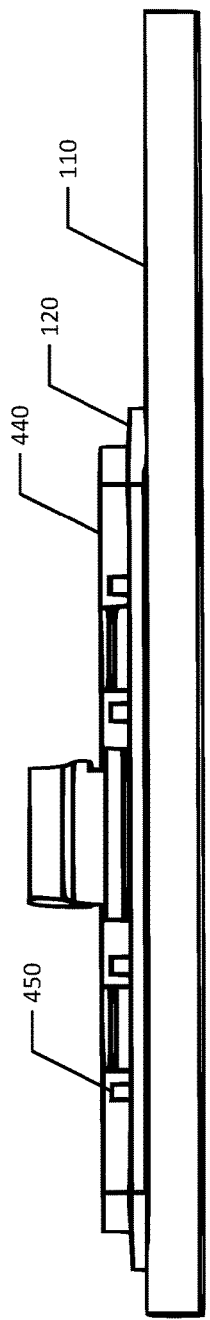
FIG. 11A is a side view of a boss element and track in a resting state.
Figure 11B:
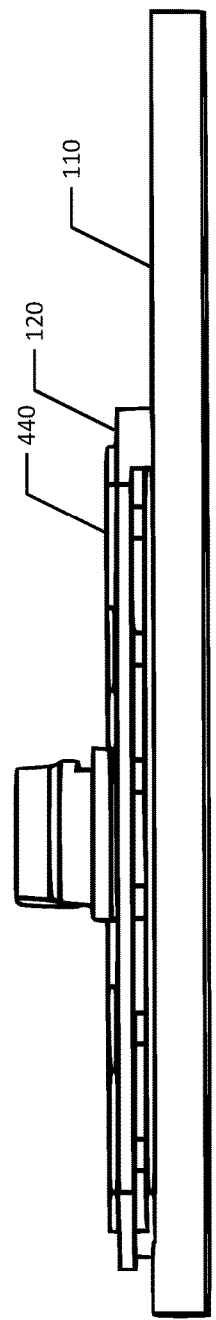
FIG. 11B is a side view of a boss element and track in a lifted state.

FIGS. 11A and 11B show track 110 and boss element 120 in different states. As illustrated in FIG. 11A, boss element 120 may bear upon track 110, seated around bridge 440. In this example, notches on the underside of bridge 440 (including, e.g., notch 450) may be empty. As illustrated in FIG. 11B, boss element 120 may be lifted a short distance from the base of track 110, such that boss element 120 no longer bears upon the base of track 110. When boss element 120 is lifted a short distance, protrusions around the inside of the band of boss element 120 (including, e.g., protrusion 630) may enter the notches on the underside of bridge 440, causing boss element 120 to engage with bridge 440 and, thereby, with track 110. Thus, boss element 120 may be separable from the base of track 110 by a limited distance, at which point boss element 120 may engage with bridge 440. Boss element 120 may engage with bridge 440 after being lifted any suitable distance from the base of track 110. For example, boss element 120 may engage with bridge 440 after being lifted 1 mm, 1.5 mm, 2 mm, or 3 mm. Lifting boss element 120 may thereby create a gap between the bottom of boss element 120 and the top of the series of ridges on track 110 (e.g., a gap of 1 mm, 1.5 mm, 2 mm, or 3 mm). The gap may be large enough to admit catch 510 to pass under the bottom of boss element 120 and over the top of one or more ridges, thereby allowing catch 510 to travel from one trough to another while boss element 120 is lifted from track 110 (and, e.g., engaged with bridge 440).

Figure 12:
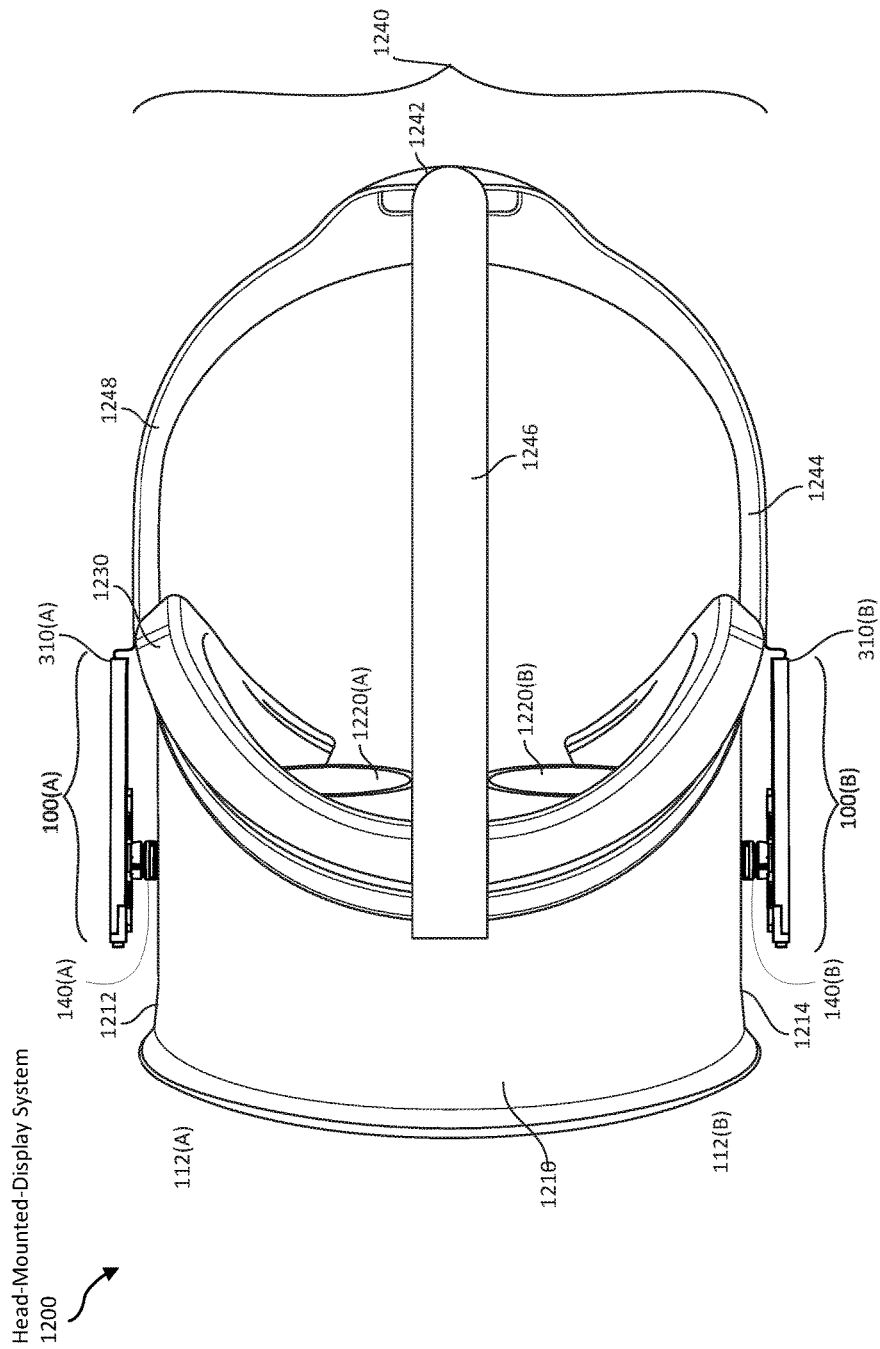
FIG. 12 is a top view of multiple strap-adjustment devices coupled to a head-mounted display.

The strap-adjustment devices shown in FIGS. 3-11 may be part of a head-mounted-display system, as shown in FIGS. 12-16. FIG. 12 is a top view of head-mounted-display system 1200 that includes two instances of strap-adjustment apparatus 100, which are referenced in FIG. 12 as 100(A) and 100(B). As shown in FIG. 12, strap-adjustment apparatus 100(A) may be mounted on a right side 1212 of a head-mounted display 1210 in a location that positions strap-adjustment apparatus 100(A) near a user's right temple when the user wears head-mounted-display 1210. Similarly, strap-adjustment apparatus 100(B) may be mounted on a left side 1214 of head-mounted display 1210 in a location that positions strap-adjustment apparatus 100(B) near a user's left temple when the user wears head-mounted display 1210.

Figure 13:
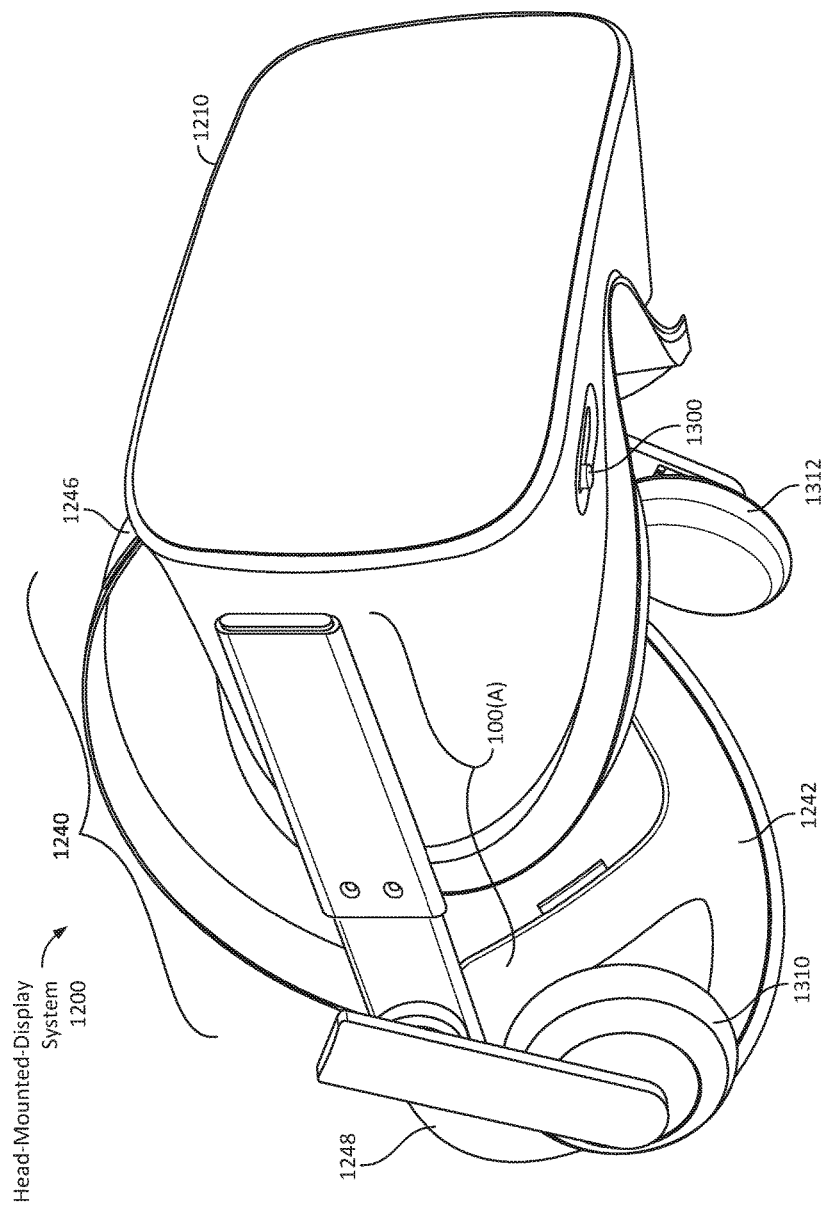
FIG. 13 is a perspective view of a head-mounted display with audio components that are coupled to strap-adjustment devices.

FIGS. 12 and 13 also show various additional elements that may be included in head-mounted-display system 1200. For example, head-mounted display 1210 may include display optics 1220(A-B) and a facial-interface system 1230 (e.g., a cushion). Head-mounted display 1210 may also be coupled to a strap system 1240, which may include a back section 1242 that forms a coupling point for a left side section 1244, a top section 1246, and a right-side section 1248. Left-side section 1244 of strap system 1240 may be coupled to strap-adjustment apparatus 1200(B), right-side section 1248 may be coupled to strap-adjustment apparatus 1200(A), and top section 1246 may be coupled to a top portion or area 1216 of head-mounted display 1210. Furthermore, as shown in FIG. 10 (a perspective view of head-mounted-display system 1200), head-mounted display 1210 may include a slider 1300 that may adjust a position and/or focus of optics 1220(A) and 1220(B). Also, as shown in FIG. 13, head-mounted-display system 1200 may include an audio system with headphones 1310 and 1312 that are coupled to strap-adjustment apparatus 100(A) and 100(B), respectively.

Figure 14:
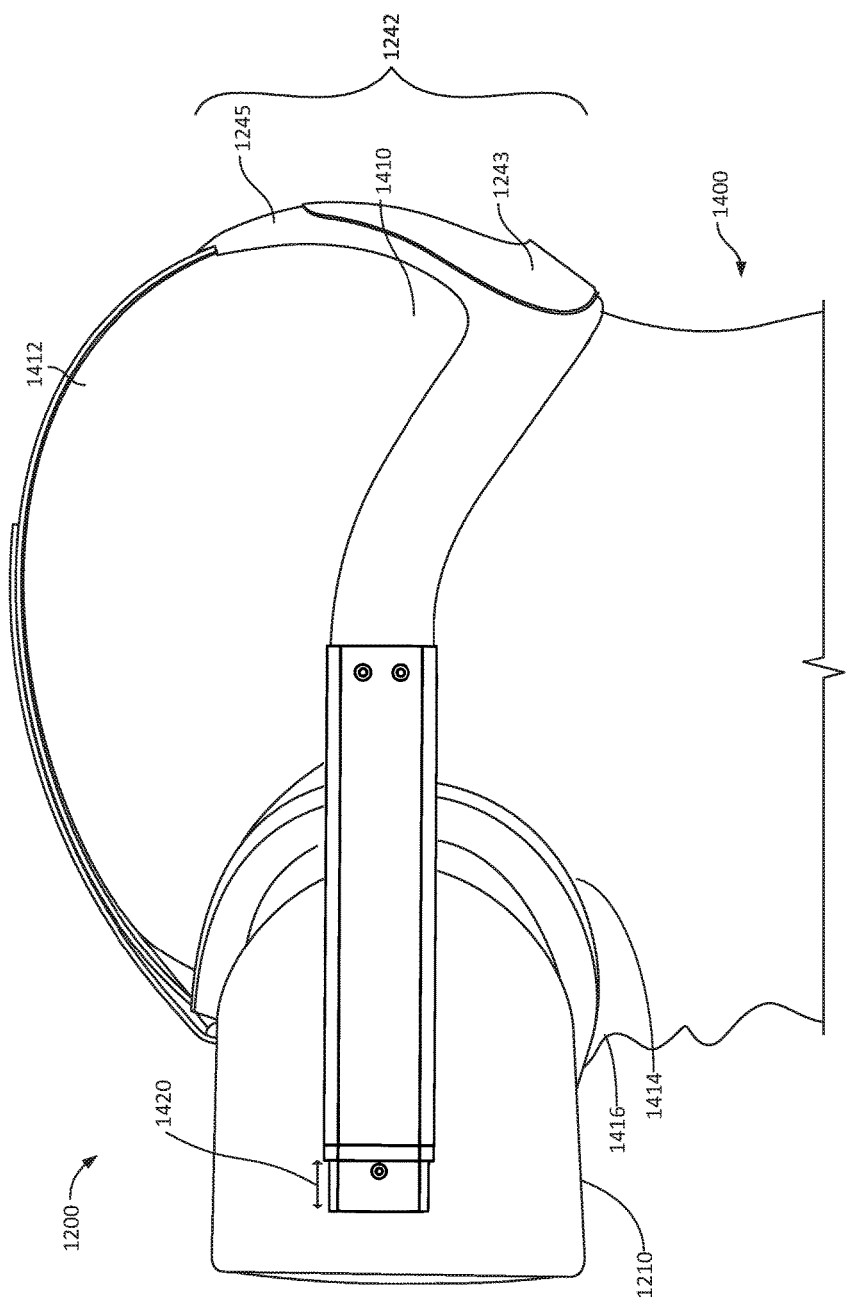
FIG. 14 is a side view of a head-mounted-display system positioned on a user's head.
Figure 15:
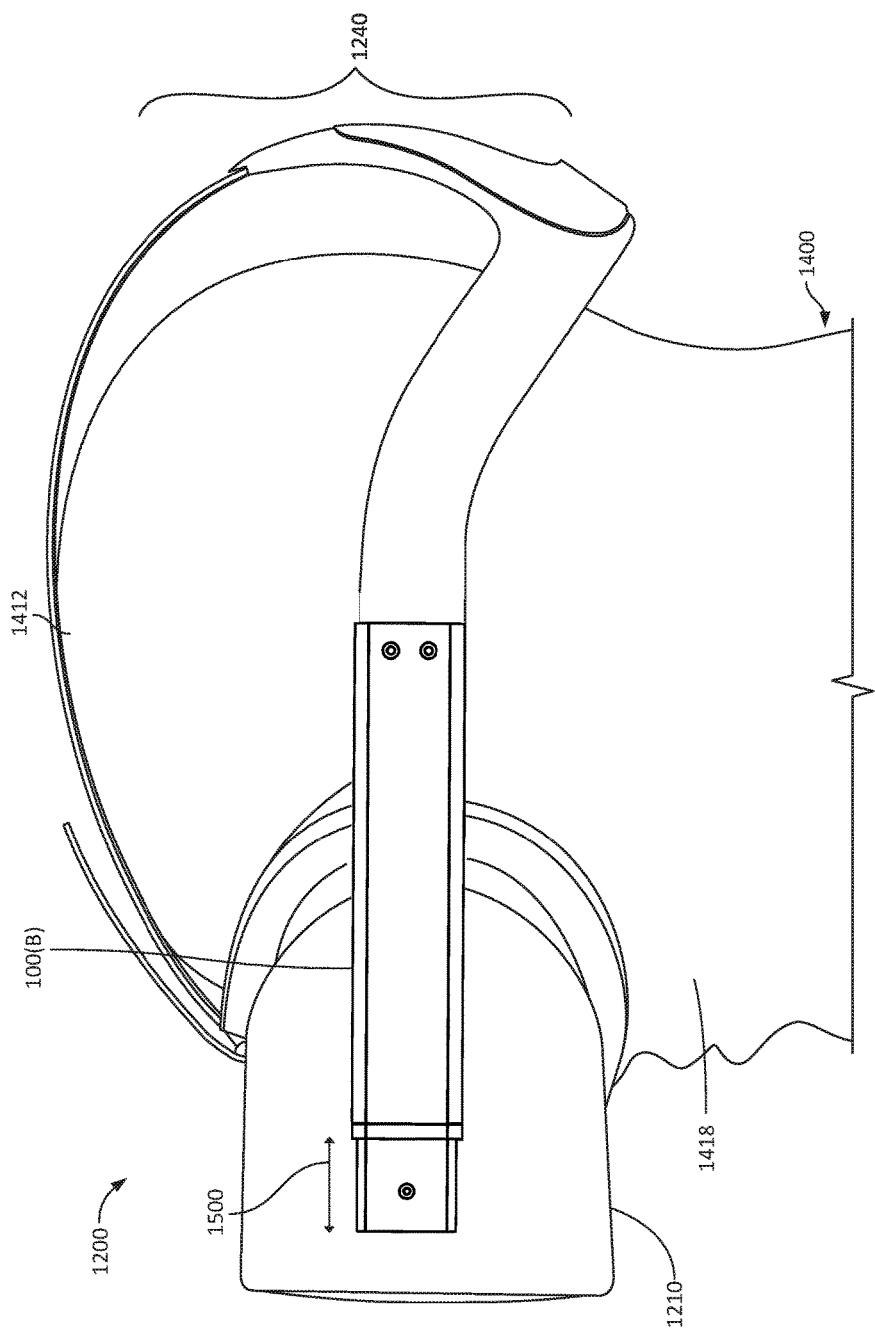
FIG. 15 is a side view of the head-mounted-display system of FIG. 14 with a strap system that is extended via strap-adjustment devices.
Figure 16:
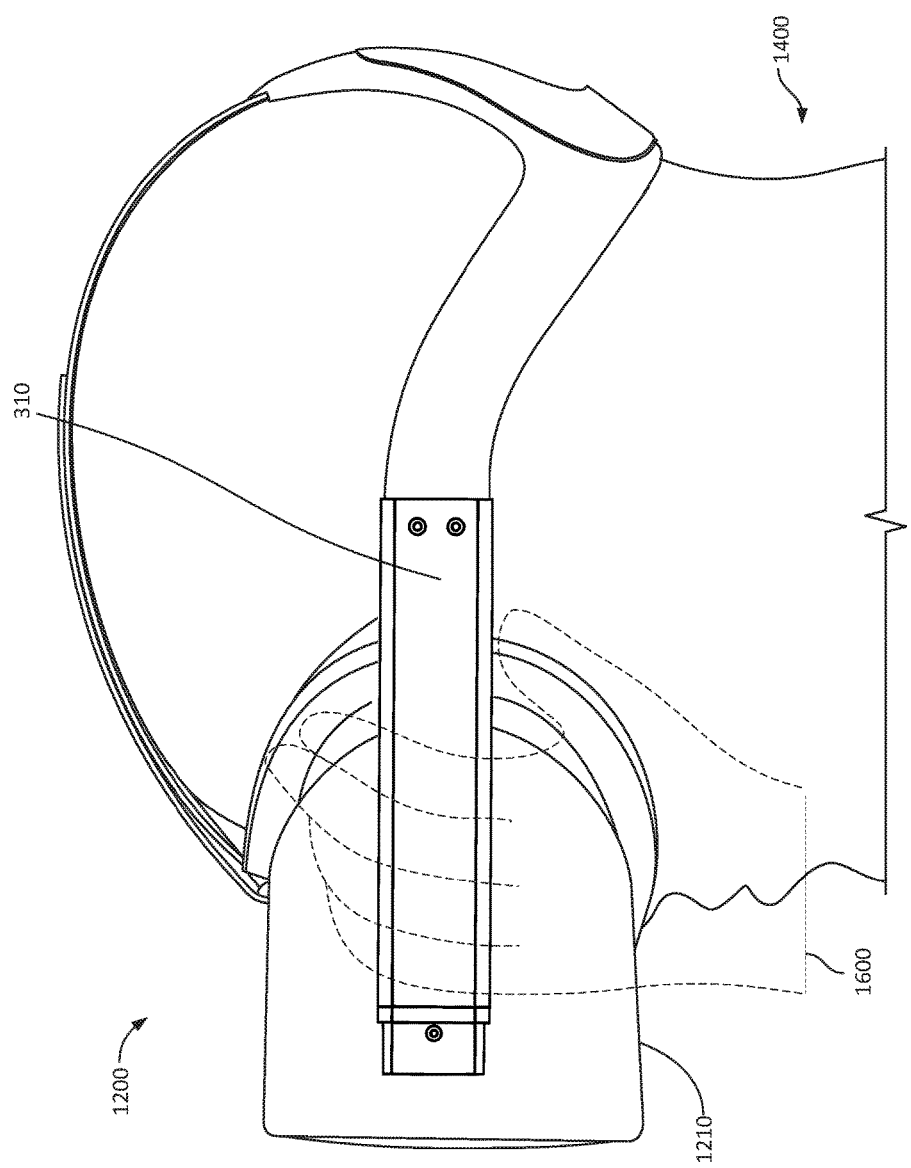
FIG. 16 illustrates a user making micro-adjustments to the head-mounted-display system of FIG. 14.

FIGS. 14-16 show examples of how a user may wear and adjust head-mounted-display system 1200. A user may place head-mounted display 1200 on their head 1400, and manipulate strap-adjustment apparatus 1000(B) to extend by a travel distance 1420, as shown in FIG. 14. While the user is wearing head-mounted-display system 1200, back section 1242 of strap system 1240 may include a lower region 1243 that conforms to a region of user's head 1400 below the user's occipital lobe 1410 (i.e., below the user's occipital protuberance). In some embodiments, back section 1242 of strap system 1240 may include an upper region 1245 that conforms to an upper-back region of user's head 1400 above occipital lobe 1410. Upper region 1245 of back section 1242 may coordinate with one or more other sections of strap system 1240 to balance and stabilize head-mounted display 1210 on user's head 1400. Additionally, strap system 1240 may allow minimum or no weight bearing on a user's cheek 1414 or nose 1416 when head-mounted display 1210 is on user's head 1400. Therefore, unlike the straps for ski goggles, which may rely on friction between the straps and the user's head and the friction between the goggles and the user's face to hold and balance the weight of the goggles, the flexible strap systems discussed in the present disclosure provide a much-improved user experience.

FIG. 15 shows strap system 1240 extended behind user's head 1400, thereby enabling convenient removal or securing of head-mounted-display system 1200 to user's head 1400. While FIG. 15 shows strap system 1240 being pulled back away from user's head 1400 with head-mounted display 1210 remaining against a user's face 1418, head-mounted display 1210 may additionally or alternatively be pulled away from user's face 1418 when the user is putting on or removing head-mounted display 1210. Further, by enabling strap system 1240 to move by travel distance 1500 (or further), strap-adjustment apparatus 100(B) may enable head-mounted-display system 1200 to be sized for various user's heads.

Turning to FIG. 16, a user wearing head-mounted-display system 1200 may make adjustments to the fit of head-mounted-display system 1200 while the user is wearing head-mounted-display system 1200. As shown, user's hand 1600 may grasp encasement 310 and pull encasement 310 away from head-mounted display 1210 and user's head 1400. Because encasement 310 may be engaged with track 110 in this direction of movement, and because mount 140 may firmly couple boss element 120 to head-mounted display 1210, by pulling encasement 310 away from head-mounted display 1210, the user may separate the base of track 110 from the bottom of boss element 120. Thus, catch 510 may be freed to pass between track 110 and boss element 120, allowing the slide (including, e.g., shuttle element 500 and encasement 310) to slide along track 110. The user may then adjust the strap system by sliding encasement 310 backward or forward along track 110 to a preferred position. In some examples, the user may slide encasement 310 by grasping encasement 310. Additionally or alternatively, the user may slide encasement 310 by pulling on the strap coupled to encasement 310 and/or on head-mounted display 1210 indirectly coupled to the strap. Once the user has identified a preferred setting for strap-adjustment apparatus 100 (i.e., where telescoping assembly 102 is extended a distance that represents the best fit for user's head 1400), user's hand 1600 may push encasement 310 back toward head-mounted display 1210 and user's head 1400, thereby placing catch 510 in a trough, restricting further movement of the slide relative to track 110.

Figure 17:
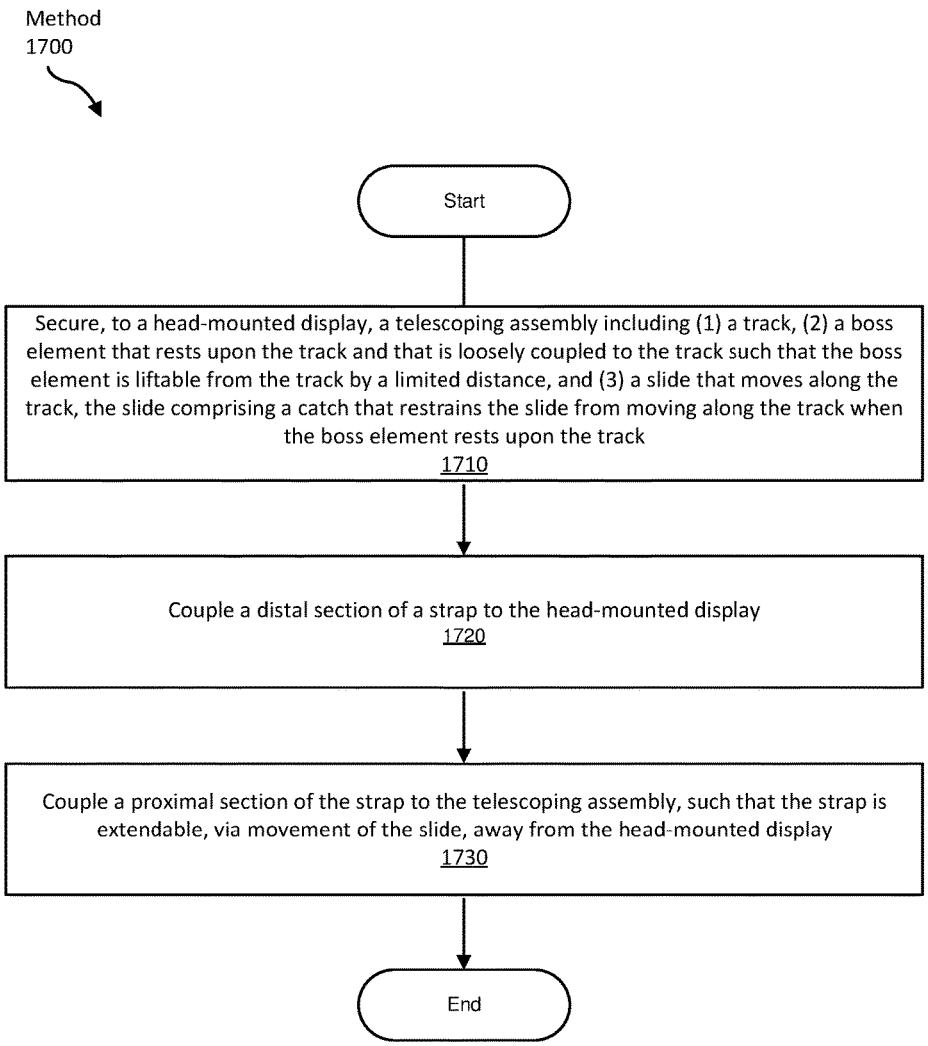
FIG. 17 is a flow diagram of a method for assembling a strap-adjustment apparatus.

FIG. 17 shows, by way of example, a method for manufacturing, assembling, using, adjusting, or otherwise configuring or creating the systems and devices presented herein. In particular, FIG. 17 illustrates a flow diagram of a method 1700 for securing a strap-adjustment apparatus to a head-mounted display. As shown in FIG. 17, at step 1710 a telescoping assembly may be secured to a head-mounted display. For example, telescoping assembly 102 may be secured to head-mounted display 1210. The telescoping assembly may include (1) a track, (2) a boss element that rests upon the track and that is loosely coupled to the track such that the boss element is liftable from the track by a limited distance, and (3) a slide that moves along the track. For example, telescoping assembly may include track 110, boss element 120 that rests upon track 110, and slide 130 that moves along track 110. Slide 130 may include catch 510 that restrains slide 130 from moving along track 110 when boss element 120 rests upon track 110.

At step 1720, a distal section of a strap may be coupled to the head-mounted display. For example, a distal section of strap system 1240 (e.g., left-side section 1244) may be coupled to head-mounted display 1210, either via a direct connection or an indirect connection (e.g., via strap-adjustment apparatus 100(B)). In such embodiments, the distal section of strap 1240 may be attached to encasement 310(B) of apparatus 100(B).

At step 1730, a proximal section of the strap may be coupled to the telescoping assembly such that the strap is extendable, via movement of the slide, away from the head-mounted display. For example, proximal section 1248 of strap system 1240 may be connected to encasement 310(A) of apparatus 100(A).

The process parameters and sequence of the steps described and/or illustrated in FIG. 14 are given by way of example only and can be varied as desired. For example, while the steps illustrated and/or described herein may be shown or discussed in a particular order, these steps do not necessarily need to be performed in the order illustrated or discussed to assemble, manufacture, or use strap-adjustment apparatus 100. The various exemplary methods described and/or illustrated in FIG. 14 may also omit one or more of the steps described or illustrated herein or include additional steps in addition to those disclosed.

As discussed throughout the instant disclosure, the disclosed methods, systems, and devices may provide one or more advantages over traditional headset fitting mechanisms. For example, the strap-adjustment devices described herein may provide simple adjustment mechanisms that require little attention and/or dexterity on the part of the user, allowing for quick adjustments free of frustration. In addition, the strap-adjustment devices described herein may provide for discrete adjustments that allow a user to quickly restore strap-adjustment devices to preferred settings and also provide sufficient precision to provide a comfortable fit for various users. Furthermore, some of the devices discussed herein may enable a user to more easily make adjustments while using a head-mounted display, thereby allowing the user to stay immersed in a virtual- or augmented-reality experience without discomfort or distraction. In general, the systems disclosed herein may improve immersion and/or enjoyment of using a head-mounted display, making virtual- and augmented-reality experiences more fulfilling or useful.

The foregoing description, for purposes of explanation, has been described with reference to specific embodiments and has been provided to enable others skilled in the art to best utilize various aspects of the example embodiments disclosed herein. However, the illustrative discussions above are not intended to be exhaustive or to limit the scope of the claims to the precise forms disclosed. Many modifications and variations are possible in view of the above teachings without departing from the spirit and scope of the instant disclosure. The instant disclosure covers all modifications, equivalents, and alternatives falling within the scope of the appended claims. Features from any of the above-mentioned embodiments may be used in combination with one another in accordance with the general principles described herein. The embodiments were chosen to best explain the principles underlying the claims and their practical applications, thereby enabling others skilled in the art to best use the embodiments with various modifications as are suited to the particular uses contemplated. The embodiments disclosed herein should be considered in all respects illustrative and not restrictive. Reference should be made to the appended claims and their equivalents in determining the scope of the instant disclosure.

The terminology used in the description of the various embodiments described herein is for the purpose of explaining particular embodiments only and is not intended to be limiting. As used in the discussion of the various highlighted embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind." Unless otherwise noted, the terms "connected to," "coupled to," and "attached to" (and their derivatives), as used in the specification and claims, are to be construed as permitting both direct and indirect (i.e., via other elements or components) connection. Furthermore, two or more elements may be coupled together with an adhesive, a clasp, a latch, a hook, a link, a buckle, a bolt, a screw, a rivet, a snap, a catch, a lock, or any other type of fastening or connecting mechanism.

What is claimed is:

1. A head-mounted-display adjustment apparatus comprising:
   a telescoping assembly comprising:
      a track;
      a boss element that bears upon the track and that is loosely coupled to the track such that the boss element is liftable from the track by a limited distance; and
      a slide that moves along the track, the slide comprising a catch that restrains the slide from moving along the track when the boss element bears upon the track;
   a mount that couples the telescoping assembly to a head-mounted display; and
   a strap comprising a distal section coupled to the head-mounted display and a proximal section coupled to the slide, such that the strap is extendable, via movement of the slide, away from the head-mounted display.

2. The head-mounted-display adjustment apparatus of claim 1, wherein:
   the track comprises:
      a planar base element; and
      a plurality of spaced ridges protruding from the planar base element, the plurality of spaced ridges defining a plurality of troughs; and
   the catch restrains the slide from moving along the track when resting in one of the plurality of troughs.

3. The head-mounted-display adjustment apparatus of claim 2, wherein:
   the boss element bears upon the track via the slide; and
   the boss element inhibits the catch from exiting a trough when the boss element bears upon the track.

4. The head-mounted-display adjustment apparatus of claim 2, wherein:
   the boss element comprises a pair of lateral surfaces that define a plurality of notch pairs;
   the slide comprises a pair of tabs adapted to catch in each of the plurality of notch pairs; and
   the plurality of notch pairs in the boss element align with the plurality of troughs in the track, such that when the pair of tabs fit in a notch pair the catch rests in a corresponding trough.

5. The head-mounted-display adjustment apparatus of claim 1, wherein the slide comprises:
   a shuttle element that comprises the catch; and
   an encasement housing the shuttle element.

6. The head-mounted-display adjustment apparatus of claim 5, wherein:
   the shuttle element comprises:
      a planar shaft element; and
      a pair of arms extending from the planar shaft element; and
   the catch bridges the pair of arms.

7. The head-mounted-display adjustment apparatus of claim 6, wherein:
   the track comprises:
      a planar base element;
      a pair of posts extending from the planar base element; and
      a bridge element connecting the pair of posts;
   the plurality of spaced ridges protrude from the planar base element under the bridge element;
   the planar shaft element of the shuttle element with the pair of arms and the catch define a hole in the shuttle element between the pair of arms; and
   the track and the shuttle element are interlinked due to one of the pair of posts extending through the hole in the shuttle element such that the catch is situated under the bridge element and between the pair of posts.

8. The head-mounted-display adjustment apparatus of claim 7, wherein the boss element comprises a band adapted to sit around the pair of posts and to engage with the bridge element when lifted from the track.

9. The head-mounted-display adjustment apparatus of claim 5, wherein the pair of arms of the shuttle element are flexible to allow the boss element to lift the catch above the plurality of spaced ridges without lifting the entire planar shaft element.

10. The head-mounted-display adjustment apparatus of claim 5, wherein the proximal section of the strap is coupled to the encasement.

11. A head-mounted-display system comprising:
   a telescoping assembly comprising:

a track;

a boss element that bears upon the track and that is loosely coupled to the track such that the boss element is liftable from the track by a limited distance; and a slide that moves along the track, the slide comprising a catch that restrains the slide from moving along the track when the boss element bears upon the track;

a head-mounted display;

a mount that couples the telescoping assembly to the head-mounted display; and a strap comprising a distal section coupled to the head-mounted display and a proximal section coupled to the slide, such that the strap is extendable, via movement of the slide, away from the head-mounted display.

12. The head-mounted-display system of claim 11, wherein the distal section of the strap is coupled to the head-mounted display via an additional mount that couples an additional telescoping assembly to the head-mounted display.

13. The head-mounted-display system of claim 11, wherein:

the mount is connected to a first section of the head-mounted display that is dimensioned to be positioned at a left side of the user's head; and the additional mount is connected to a second section of the head-mounted display that is dimensioned to be positioned at a right side of the user's head.

14. The head-mounted-display system of claim 13, wherein the strap comprises a medial section coupled to a third section of the head-mounted display that is dimensioned to be positioned at a forehead of the user.

15. The head-mounted-display system of claim 11, wherein:

the track comprises:

a planar base element; and a plurality of spaced ridges protruding from the planar base element, the plurality of spaced ridges defining a plurality of troughs; and the catch restrains the slide from moving along the track when resting in one of the plurality of troughs.

16. The head-mounted-display system of claim 15, wherein:

the boss element bears upon the track via the slide; and the boss element inhibits the catch from exiting a trough when the boss element bears upon the track.

17. The head-mounted-display system of claim 15, wherein:

the boss element comprises a pair of lateral surfaces that define a plurality of notch pairs;

the slide comprises a pair of tabs adapted to catch in each of the plurality of notch pairs; and the plurality of notch pairs in the boss element align with the plurality of troughs in the track, such that when the pair of tabs fit in a notch pair the catch rests in a corresponding trough.

18. The head-mounted-display system of claim 11, wherein the slide comprises:

a shuttle element that comprises the catch; and an encasement housing the shuttle element.

19. The head-mounted-display system of claim 18, wherein:

the shuttle element comprises:

a planar shaft element; and a pair of arms extending from the planar shaft element; and the catch bridges the pair of arms.

20. A method comprising:

securing, to a head-mounted display, a telescoping assembly comprising:

a track;

a boss element that bears upon the track and that is loosely coupled to the track such that the boss element is liftable from the track by a limited distance; and a slide that moves along the track, the slide comprising a catch that restrains the slide from moving along the track when the boss element bears upon the track;

coupling a distal section of a strap to the head-mounted display; and coupling a proximal section of the strap to the telescoping assembly, such that the strap is extendable, via movement of the slide, away from the head-mounted display.

* * * * *

UNITED STATES PATENT AND TRADEMARK OFFICE
CERTIFICATE OF CORRECTION

Page 1 of 1

PATENT NO. : 10,203,506 B1
APPLICATION NO. : 15/589925
DATED : February 12, 2019
INVENTOR(S) : Joseph Patrick Sullivan It is certified that error appears in the above-identified patent and that said Letters Patent is hereby corrected as shown below:

On the Title Page

In Column 1, item (71), Applicant, Lines 1-2, delete "Oculus VR, LLC, Menlo Park, CA (US)" and insert -- Facebook Technologies, LLC, Menlo Park, CA (US) --, therefor.

Signed and Sealed this
Twenty-third Day of April, 2019

Andrei Iancu
*Director of the United States Patent and Trademark Office*